United States Patent [19]

Hayashi et al.

[11] 4,219,358
[45] Aug. 26, 1980

[54] ANTI-CORROSION COATING COMPOSITION

[75] Inventors: Toshiharu Hayashi, Yokohama; Kenji Kurosawa, Yokosuka, both of Japan

[73] Assignee: Dai Nippon Toryo Co., Ltd., Osaka, Japan

[21] Appl. No.: 940,608

[22] Filed: Sep. 8, 1978

[30] Foreign Application Priority Data

Sep. 13, 1977 [JP] Japan ................... 52-109506
Jun. 6, 1978 [JP] Japan ................... 53-68112

[51] Int. Cl.$^2$ ............................................. C09D 5/10
[52] U.S. Cl. ....................... 106/1.17; 106/14.15; 106/14.21; 106/84; 106/287.14; 106/287.16; 106/287.3
[58] Field of Search ............ 106/1.16, 1.17, 14.21, 106/84, 287.13, 287.16, 287.18, 14.15, 287.14, 287.3

[56] References Cited

U.S. PATENT DOCUMENTS

| | | | |
|---|---|---|---|
| 2,576,307 | 11/1951 | Nordon | 106/84 |
| 3,032,426 | 5/1962 | Lee | 106/84 |
| 3,130,061 | 4/1964 | McMahon et al. | 106/84 |
| 3,356,515 | 12/1967 | McGlothlin | 106/84 |
| 3,455,709 | 7/1969 | Sears | 106/84 |
| 3,899,333 | 8/1975 | Berman et al. | 106/300 |

*Primary Examiner*—Lorenzo B. Hayes
*Attorney, Agent, or Firm*—Dennis P. Clarke

[57] ABSTRACT

The present invention relates to an anti-corrosion coating composition comprising as main components a silicate and zinc powder wherein ultrafine particulate aluminum oxide and/or ultrafine particulate titanium oxide is incorporated in an amount of 0.05 to 2.0 parts by weight per 100 parts by weight of the zinc powder.

5 Claims, No Drawings

ANTI-CORROSION COATING COMPOSITION

BACKGROUND OF THE INVENTION (1) Field of the Invention

The present invention relates to an anti-corrosion coating composition generally called a zinc-rich paint (hereinafter referred to as "ZRP"). More particularly, the invention relates to an anti-corrosion coating composition comprising a silicate as a binder and zinc powder as an anti-corrosive pigment, wherein ultrafine particulate aluminum oxide and/or ultrafine particulate titanium oxide is incorporated in a specific amount.

(2) Description of the Prior Art

Coating compositions comprising a silicate as a binder have been known in the art, and they are disclosed, for example, in the specification of U.S. Pat. Nos. 2,807,552, 2,914,413, 3,056,684, 3,239,521, 3,239,549, 3,241,990, 3,392,039, 3,454,410, 3,895,136 and 3,900,630.

Further, so-called inorganic zinc-rich paints (hereinafter referred to as "I-ZRP") formed by incorporating zinc powder into various alkali metal silicate binders as disclosed in the foregoing known literature references have been known from old. In the industry of manufacture of steel structures or the ship-building industry, there have been broadly adopted methods in which these paints are coated on surfaces of steel structures to control or prevent corrosion of steel.

Protective mechanisms, formulations, properties and uses of ZRP inclusive of I-ZRP are illustrated in detail in "Paint and Varnish Production", April pages 35–41, May pages 87–94, June pages 57–60 and July pages 75–76 (1964).

Further, I-ZRP comprising sodium silicate, potassium silicate or the like as a binder and zinc powder as an anti-corrosive pigment is disclosed in detail, for example, in the specifications of U.S. Pat. No. 2,509,875, U.S. Pat. No. 2,576,307, U.S. Pat. No. 3,372,038, U.S. Pat. No. 3,551,173 and British Pat. No. 1,189,436.

ZRP such as mentioned above prevents corrosion of steel coated therewith through the electrochemical activity of the large quantity of zinc powder which is incorporated therein. Based on the same technical concept, it has been tried to mix aluminum powder with zinc powder and use the resulting mixture. For example, there are known I-ZRP comprising a binder composed of potassium silicate or a mixture of potassium silicate and sodium silicate and an anti-corrosive pigment containing zinc powder having a particle size of 5 to $10\mu$ and aluminum powder having a particle size of $10\mu$ or less at a mixing weight ratio of 1:9 to 9:1 (see the specification of U.S. Pat. No. 3,423,229), a coating composition comprising a pigment mixture including 98 to 60% by weight of a zinc pigment and 2 to 40% by weight of an aluminum pigment and an appropriate binder (see Japanese Patent Publication No. 5571/63) and ZRP comprising a mixture containing aluminum powder and zinc powder at a weight ratio of 0.03 to 0.4 and a polystyrene resin. Further, as a heat-resistant paint for artificial satellites, rockets and the like, there is known a coating composition comprising an alkali metal silicate, aluminum oxide, potassium hydroxide, boric acid and zinc oxide.

In case of I-ZRP, more than 80% by weight of zinc powder is generally incorporated in the resulting coating and corrosion of steel is electrochemically controlled or prevented by the zinc powder.

However, as a result of the electrochemical reaction there are formed corrosion products of zinc, such as zinc hydroxide, zinc oxide and zinc carbonate (hereinafter, they will be inclusively called "white deposit"). Further, in general, as the amount of zinc powder in the coating is increased to enhance the electrochemical anti-corrosive action, the amount of white deposit generated is proportionally increased.

The electrochemical action of I-ZRP on steel is ordinarily expressed in terms of the anti-corrosive potential. From the theoretical and practical viewpoints, it is ordinarily considered that the anti-corrosive potential should be lower than $-850$ mV based on a copper electrode in a saturated copper sulfate solution.

In conventional I-ZRP, since it is a primary object to control corrosion of steel, a large quantity of a zinc powder is incorporated, and most conventional I-ZRP have an anti-corrosive potential of about $-1020$ mV. This potential is sufficient to prevent corrosion, but because of too low a potential, zinc is consumed excessively in an unnecessarily large amount. Accordingly, generation of white deposit is promoted and it is often observed that white deposit is densely formed on the entire surface of the coating of I-ZRP.

Deposition or accumulation of white deposit, of course, drastically degrades the appearance of the I-ZRP coating. When other paint is to be coated over the I-ZRP coating, it is necessary to remove such white deposit. If another paint is directly applied to the I-ZRP coating without removal of white deposit, adhesion is degraded and good results are not obtained. Moreover, even if another paint is applied after removal of white deposit, white dust gradually accumulates, and in extreme cases, peeling of the coating formed on the I-ZRP coating is readily caused.

In view of the foregoing, an ideal I-ZRP is desired to have such a characteristic property that corrosion of steel can be effectively controlled by incorporation of a large quantity of zinc powder and consumption of incorporated zinc powder can be maintained at a very low level, namely formation of white deposit can be completely prevented or can be controlled to a very low level. However, such an ideal I-ZRP has not yet been developed.

SUMMARY OF THE INVENTION

The present invention has been completed as a result of our research made with a view to overcoming and eliminating the foregoing defects involved in conventional I-ZRP.

It is therefore a primary object of the present invention to provide an anti-corrosion coating composition in which formation of white deposit can be controlled or prevented and which maintains a high anti-corrosive activity on steel.

Another object of the present invention is to provide an anti-corrosion coating composition in which the anti-corrosive potential of the coating on steel is maintained in an optimum range of $-850$ mV to $-950$ mV and corrosion of steel can be completely prevented electrochemically.

Still another object of the present invention is to provide an anti-corrosion coating composition having a long pot-life.

In accordance with the present invention, there is provided an anti-corrosion coating composition comprising as main components zinc powder and at least one binder selected from the group consisting of alkyl orthosilicates and alkali metal silicates, wherein at least one member selected from the group consisting of ultrafine particulate aluminum oxide and ultrafine particulate titanium oxide is incorporated in an amount of 0.05 to 2.0 parts by weight per 100 parts by weight of the zinc powder.

According to one preferred embodiment of the present invention, in the above-mentioned anti-corrosion coating composition, there is further incorporated an amine in an amount of 100 to 200 parts by weight per 100 parts by weight of said ultrafine particulate oxide.

According to another preferred embodiment of the present invention, in the above-mentioned anti-corrosion coating composition, there is further incorporated at least one member selected from the group consisting of pottasium thiosulfate, sodium thiosulfate, potassium permanganate, potassium sulfide and sodium sulfide in an amount of 0.1 to 0.5 part by weight per 100 parts by weight of the zinc powder.

In the above preferred embodiments, the amine is incorporated to prevent reduction of the electrochemical anti-corrosive action owing to increase of the amount of the ultrafine particulate oxide added to the zinc powder, and such a specific compound as sodium thiosulfate is added to prevent occurrence of gelation in the anti-corrosion coating composition and prolong the pot-life thereof.

Other objects and features of the present invention will become apparent from the following detailed description.

DETAILED DESCRIPTION OF THE INVENTION

The "alkyl orthosilicate" that is used in the present invention is a compound represented by the following general formula:

$$Si(OR)_4$$

wherein R stands for an alkyl group having 1 to 4 carbon atoms.

For example, there can be mentioned methyl orthosilicate, ethyl orthosilicate, butyl orthosilicate and products obtained by partially hydrolyzing these orthosilicates with a mineral acid such as hydrochloric acid or phosphoric acid.

The "alkali metal silicate" that is used in the present invention is a compound represented by the following general formula:

$$M_2O \cdot xSiO_2$$

wherein x is a number of from 0.5 to 10 and M is a member selected from the group consisting of alkali metals belonging to the Group IA of the Periodic Table.

For example, there can be mentioned sodium silicate, potassium silicate and lithium silicate. These alkali metal silicates may be used singly or in the form of a mixture of two or more of them.

In short, all of the binders customarily used for I-ZRP can be used in the anti-corrosion coating composition of the present invention.

Zinc powder customarily used for I-ZRP can be conveniently used in the present invention.

The weight ratio of the solid of the alkyl orthosilicate or alkali metal silicate to the zinc powder is in the range of from 1:12 to 1:18, preferably from 1:15 to 1:18.

The ultrafine particulate aluminum oxide and/or ultrafine particulate titanium oxide that is used in the present invention has an average particle size of about 5 to about 40 m$\mu$ (preferably 15 to 25 m$\mu$ in case of the particulate aluminum oxide and 25 to 35 m$\mu$ in case of the particulate titanium oxide) and a specific surface area of 30 to 120 m$^2$/g (preferably 85 to 120 m$^2$/g in case of the particulate aluminum oxide and 35 to 70 m$^2$/g in case of the particulate titanium oxide).

In the present invention, the ultrafine particulate aluminum oxide and/or ultrafine particulate titanium oxide is incorporated in an amount of 0.05 to 2 parts by weight per 100 parts by weight of the zinc powder. If the amount of the ultrafine particulate oxide exceeds 1.0 part by weight per 100 parts by weight of the zinc powder, the effect of preventing formation of white deposit is promoted, and if such a large amount of the ultrafine particulate oxide is incorporated in the zinc powder in advance, there can be attained various effects, for example, an effect of facilitating uniform dispersion of the zinc powder into the binder, an effect of preventing occurrence of agglomeration in the zinc powder and an effect of imparting to the resulting coating composition an appropriate thixotropic characteristic and preventing precipitation of the zinc powder. However, in this case, corrosion of steel (formation of rust) is likely to occur. Namely, the anti-corrosive effect is relatively degraded. Accordingly, in the present invention, it is preferred that the ultrafine particulate oxide be incorporated in an amount of 0.07 to 1.0 part by weight, especially 0.08 to 0.5 part by weight, per 100 parts by weight of the zinc powder.

When the amount of the ultrafine particulate oxide is smaller than 0.05 part by weight per 100 parts by weight of the zinc powder, no substantial effect of preventing formation of white deposit can be attained, and the anti-corrosion potential is rendered too less noble to the potential of iron, and therefore the steel is overprotected. As a result, formation of white deposit becomes extreme. On the other hand, when the ultrafine particulate oxide is incorporated in an amount larger than 2.0 parts by weight per 100 parts by weight of the zinc powder, the anti-corrosion potential is brought close to the potential of iron. Accordingly, in this case, white deposit is not formed but an electrochemical action sufficient to prevent corrosion of steel cannot be attained and corrosion of steel (formation of rust) takes place. Further, since the volume of the ultrafine particulate oxide is increased, the viscosity of the composition is increased and the adaptability to the coating operation is drastically degraded.

In the present invention, the ultrafine particulate aluminum oxide and/or ultrafine particulate titanium oxide may be incorporated in advance in a solution of the alkyl orthosilicate or alkali metal silicate or it may be added to the zinc powder.

In the anti-corrosion coating composition of the present invention, an amine may be further incorporated in an amount of 100 to 200 parts by weight per 100 parts by weight of the ultrafine particulate aluminum oxide and/or ultrafine particulate titanium oxide.

As the amine, there can be mentioned, for example, monoethanol amine, diethanol amine, triethanol amine, triethylene tetramine, tetraethylene pentamine and pentaethylene hexamine. These amines may be used singly or in the form of a mixture of two or more.

In the present invention, the amine is incorporated so as to prevent reduction of the electrochemical action of zinc to iron even if the amount of the ultrafine particulate oxide added to the zinc powder is relatively increased. Accordingly, when the ultrafine particulate oxide is added in a relatively large amount, it is preferred that the amount of the amine be proportionally increased.

When the amount of the amine is smaller than 100 parts by weight per 100 parts by weight of the ultrafine particulate oxide, with increase of the amount of the ultrafine particulate oxide the electrochemical action of zinc is reduced. If the amine is incorporated in an amount exceeding 200 parts by weight per 100 parts by weight of the ultrafine particulate oxide, the resulting composition comes to have an offensive smell and it has bad influences on the coating operation. Further, the electrochemical action is not so prominently increased as might be expected from the increase of the amount of the amine. Namely, the addition efficiency is lowered, and from the economical viewpoint, it is not preferred to incorporate the amine in such a large amount.

Incidentally, in the case where an alkyl orthosilicate is used as the binder, addition of the amine results in promotion of gelation of the composition. Accordingly, the composition cannot be put into practical use.

According to another preferred embodiment of the present invention, in the above-mentioned anti-corrosion coating composition comprising an alkali metal silicate, zinc powder and ultrafine particulate aluminum oxide and/or ultrafine particulate titanium oxide, there is further incorporated at least one member selected from the group consisting of potassium thiosulfate, sodium thiosulfate, potassium permanganate, sodium sulfide and potassium sulfide in an amount of 0.1 to 0.5 part by weight per 100 parts by weight of the zinc powder.

In the present invention, when the alkali metal silicate, zinc powder and ultrafine particulate oxide are mixed together, hydrogen gas is generated with the lapse of time by internal reaction and the resulting composition tends to gel. However, if the above-mentioned specific compound is incorporated, generation of hydrogen gas is controlled and gelation is prevented. As a result, the pot-life of the composition is prolonged.

When the amount of the above compound is smaller than 0.1 part by weight per 100 parts by weight of the zinc powder, the effect of prolonging the pot-life is very low. In contrast, if the amount of the above compound exceeds 0.5 part by weight per 100 parts by weight of the zinc powder, cracks are readily formed on the resulting coating and good results cannot be obtained.

In the present invention, in the case where an alkyl orthosilicate is used as the binder, if the above-mentioned specific compound is incorporated, gelation is caused. Accordingly, in this case, addition of the above-mentioned specific compound is not preferred from the practical viewpoint. In this case, the pot-life of the resulting composition can be appropriately adjusted by controlling the degree of hydrolysis in the alkyl orthosilicate.

In the present invention, at least the zinc powder and the binder are separately stored, and they are mixed together at the time of application.

The above-mentioned coating composition of the present invention is coated on a steel plate according to a customary method and dried at room temperature or forced dried to form a coating on the steel plate.

The so obtained coating is excellent in anti-corrosive effect and formation of white deposit is effectively controlled. Accordingly, coating properties of a paint to be applied to this coating are not degraded at all.

The coating formed from the coating composition of the present invention is excellent in the resistance to hot water and is characterized in that even if the coating is dipped in water, formation of craters owing to heterogeneous dissolution of zinc does not occur.

Moreover, although handling of an alkali metal silicate solution is very difficult because the viscosity is increased with elevation of the temperature, in the composition of the present invention, such temperature dependency is eliminated and the composition is very easy to handle.

The present invention will now be described in detail with reference to the following Examples that by no means limit the scope of the invention.

In these Examples, all of "parts" and "%" are by weight unless otherwise indicated.

EXAMPLE 1

To 100 parts of zinc powder was added 0.05 part of ultrafine particulate aluminum oxide having an average particle size of 5 to 20 mμ and a specific surface area of 85 to 120 m$^2$/g (Aluminium Oxide C sold by Nippon Aerosil K.K.), and the mixture was added to 43 parts of a hydrolyzed ethyl silicate solution (non-volatile content = 13.3%; solution in ethanol) to form an anti-corrosion coating composition of the present invention.

The coating composition was coated on both the surfaces of a sand blast-treated steel plate having a size of 150 mm × 50 mm × 1.6 mm by means of an air spray to a coating thickness of about 50μ.

The coated steel plate was allowed to stand in an atmosphere maintained at a temperature of 20° C. and a relative humidity of 75% for 7 days to obtain a dry coating, and the coated steel plate was subjected to comparative experiments.

In the following Examples and Comparative Examples, the operation of preparation of coating compositions and the coating operation were carried out in the same manner as described above.

EXAMPLE 2

Hydrolyzed ethyl silicate solution (non-volatile content = 13.3%): 43.0 parts
Zinc powder: 100.0 parts
Ultrafine particulate titanium oxide (Titanium Oxide P-25 sold by Nippon Aerosil K.K.; average particle size = 15–40 mμ, specific surface area = 35 to 70 m$^2$/g): 0.2 part

EXAMPLE 3

Hydrolyzed ethyl silicate solution (non-voltatile content = 13.3%): 43.0 parts
Zinc powder: 100.0 parts
Ultrafine particulate aluminum oxide: 0.5 part

EXAMPLE 4

Hydrolyzed ethyl silicate solution (non-volatile content = 13.3%): 43.0 parts
Zinc powder: 100.0 parts
Ultrafine particulate titanium oxide: 1.0 part

EXAMPLE 5

Lithium silicate aqueous solution (non-volatile content=22.0%): 33.3 parts
Zinc powder: 100.0 parts
Ultrafine particulate aluminum oxide: 0.05 part

EXAMPLE 6

Lithium silicate aqueous solution (non-volatile content=22.0%): 33.3 parts
Zinc powder: 100.0 parts
Ultrafine particulate titanium oxide: 0.2 part

EXAMPLE 7

Lithium silicate aqueous solution (non-volatile content=22.0%): 33.3 parts
Zinc powder: 100.0 parts
Ultrafine particulate aluminum oxide: 0.5 part

EXAMPLE 8

Lithium silicate aqueous solution (non-volatile content=22.0%): 33.3 parts
Zinc powder: 100.0 parts
Ultrafine particulate titanium oxide: 1.0 part

EXAMPLE 9

Potassium silicate aqueous solution (non-volatile content=30.0%): 18.8 parts
Water: 6.3 parts
Zinc powder: 100.0 parts
Ultrafine particulate titanium oxide: 0.05 part

EXAMPLE 10

Potassium silicate aqueous solution (non-volatile content=30.0%): 18.8 parts
Water: 6.3 parts
Zinc powder: 100.0 parts
Ultrafine particulate aluminum oxide: 0.2 part

EXAMPLE 11

Potassium silicate aqueous solution (non-volatile content=30.0%): 18.8 parts
Water: 6.3 parts
Zinc powder: 100.0 parts
Ultrafine particulate titanium oxide: 0.5 part

EXAMPLE 12

Potassium silicate aqueous solution (non-volatile content=30.0%): 18.8 parts
Water: 6.3 parts
Zinc powder: 100.0 parts
Ultrafine particulate aluminum oxide: 1.0 part

COMPARATIVE EXAMPLE 1

Hydrolyzed ethyl silicate solution (non-volatile content=13.3%): 43.0 parts
Zinc powder: 100.0 parts

COMPARATIVE EXAMPLE 2

Lithium silicate aqueous solution (non-volatile content=22.0%): 33.3 parts
Zinc powder: 100.0 parts
Ultrafine particulate aluminum oxide: 0.02 part

COMPARATIVE EXAMPLE 3

Lithium silicate aqueous solution (non-volatile content=22.0%): 33.3 parts
Zinc powder: 100.0 parts
Talc: 10.0 parts Results of the comparative tests are shown in Table 1.

Table 1

| Example No. | Anti-Corrosive Potential* (−mV) | | | | | | Formation of White Deposit** |
|---|---|---|---|---|---|---|---|
| | after 1 day | after 10 days | after 20 days | after 40 days | after 60 days | after 90 days | |
| 1 | 920 | 915 | 920 | 920 | 920 | 920 | o |
| 2 | 910 | 910 | 920 | 910 | 920 | 910 | o |
| 3 | 900 | 905 | 900 | 890 | 895 | 890 | o |
| 4 | 895 | 890 | 890 | 890 | 885 | 890 | o |
| 5 | 930 | 925 | 925 | 925 | 920 | 920 | o |
| 6 | 890 | 910 | 915 | 910 | 910 | 910 | o |
| 7 | 870 | 890 | 890 | 900 | 900 | 900 | o |
| 8 | 870 | 870 | 870 | 870 | 870 | 870 | o |
| 9 | 940 | 935 | 930 | 930 | 930 | 930 | o |
| 10 | 895 | 910 | 910 | 900 | 900 | 900 | o |
| 11 | 900 | 890 | 890 | 900 | 890 | 890 | o |
| 12 | 880 | 870 | 870 | 860 | 870 | 870 | o |
| Comparative Example 1 | 1060 | 1060 | 1060 | 1040 | 1040 | 1040 | x |
| Comparative Example 2 | 1040 | 1050 | 1050 | 1050 | 1050 | 1050 | x |
| Comparative Example 3 | 900 | 940 | 950 | 980 | 1000 | 1000 | x |

Note
*dipped in 3% sodium chloride solution, based on a copper electrode in a saturated copper sulfate solution.
**dipped in 3% sodium chloride solution for 90 days, observed with the naked eye.
o: hardly any formation of white deposit was observed
x: formation of white deposit was conspicuous.

As will be apparent from the comparative test results shown in Table 1, coatings formed from compositions of the present invention have an anti-corrosive potential within an optimum range of from −850 mV to −950 mV and hardly any formation of white deposit is observed.

In coatings formed in Comparative Examples 1 and 2, the anti-corrosive potential is more less snoble than −950 mV, and therefore, corrosion of zinc is extreme and formation of white deposit is conspicuous.

Even if the anti-corrosive potential is controlled by incorporation of talc as in Comparative Example 3, formation of white deposit is conspicuous and the coating composition cannot be put into practical use.

EXAMPLE 13

To 100 parts of zinc powder was added 0.05 part of ultrafine particulate aluminum oxide having an average particle size of 5 to 20 m$\mu$ and a specific surface area of 85 to 120 m$^2$/g (Aluminium Oxide C sold by Nippon Aerosil K.K.), and the mixture was added to a composition comprising 33.3 parts of a lithium silicate aqueous solution (non-volatile content=22.0%), 0.05 part of monoethanol amine and 1 part of water to form an anti-corrosion coating composition of the present invention.

The so obtained coating composition was coated on both the surfaces of a sand blast-treated steel plate having a size of 150 mm×50 mm×1.6 mm by means of an air spray so that the coating thickness was about 50$\mu$.

The coated steel plate was allowed to stand in an atmosphere maintained at a temperature of 20° C. and a relative humidity of 75% for 7 days to obtain a dry coating. The so obtained coated steel plate was subjected to various comparative tests to obtain results shown in Table 2.

In the following Examples, the operation of preparation of coating compositions and the coating operation were carried out in the same manner as described above, and the resulting coated steel plates were subjected to the same comparative tests to obtain results shown in Table 2.

EXAMPLE 14

Lithium silicate aqueous solution (non-volatile content=22.0%): 33.3 parts
Zinc powder: 100.0 parts
Ultrafine particulate titanium oxide (Titanium Oxide P-25 sold by Nippon Aerosil K.K.; average particle size=15–40 mμ, specific surface area=35–70 m²/g): 0.1 part
Triethanol amine: 0.2 part

EXAMPLE 15

Lithium silicate aqueous solution (non-volatile content=22.0%): 30.0 parts
Zinc powder: 100.0 parts
Ultrafine particulate aluminum oxide: 0.5 part
Tetraethylene pentamine: 0.5 part

EXAMPLE 16

Potassium silicate aqueous solution (non-volatile content=30.0%): 18.8 parts
Zinc powder: 100.0 parts
Ultrafine particulate aluminum oxide: 1.0 part
Pentaethylene hexamine: 1.0 part
Potassium permanganate: 0.3 part
Water: 7.0 parts

EXAMPLE 17

Potassium silicate aqueous solution (non-volatile content=30.0%): 20.0 parts
Zinc powder: 100.0 parts
Ultrafine particulate aluminum oxide: 1.5 parts
Triethylene tetramine: 3.0 parts
Sodium thiosulfate: 0.5 part
Water: 8.0 parts

EXAMPLE 18

Potassium silicate aqueous solution (non-volatile content=30.0%): 20.0 parts
Zinc powder: 100.0 parts
Ultrafine particulate titanium oxide: 2.0 parts
Pentaethylene hexamine: 4.0 parts
Sodium sulfide: 0.3 part
Water: 8.0 parts

EXAMPLE 19

Lithium silicate aqueous solution (non-volatile content=22.0%): 12.0 parts
Potassium silicate aqueous solution (non-volatile content=30.0%): 8.0 parts
Zinc powder: 100.0 parts
Ultrafine particulate aluminum oxide: 0.5 part
Monoethanol amine: 0.3 part
Triethylene tetramine: 0.3 part
Potassium thiosulfate: 0.2 part
Water: 3.0 parts

EXAMPLE 20

Lithium silicate aqueous solution (non-volatile content=22.0%): 12.0 parts
Potassium silicate aqueous solution (non-volatile content=30.0%): 8.0 parts
Zinc powder: 100.0 parts
Ultrafine particulate titanium oxide: 1.0 part
Pentaethylene hexamine: 2.0 parts
Potassium sulfide: 0.1 part
Water: 2.0 parts

EXAMPLE 21

Lithium silicate aqueous solution (non-volatile content=22.0%): 12.0 parts
Sodium silicate aqueous solution (non-volatile content=32.0%): 9.0 parts
Zinc powder: 100.0 parts
Ultrafine particulate aluminum oxide: 0.5 part
Monoethanol amine: 1.0 part
Potassium permanganate: 0.1 part
Water: 2.0 parts

EXAMPLE 22

Lithium silicate aqueous solution (non-volatile content=22.0%): 12.0 parts
Sodium silicate aqueous solution (non-volatile content=32.0%): 9.0 parts
Zinc powder: 100.0 parts
Ultrafine particulate titanium oxide: 2.0 parts
Tetraethylene pentamine: 4.0 parts
Sodium thiosulfate: 0.5 part
Water: 3.0 parts Table 2

| Example No. | Anti-Corrosive Potential* (−mV) | | | | | | Formation of White Deposit** |
|---|---|---|---|---|---|---|---|
| | after 1 day | after 10 days | after 20 days | after 40 days | after 60 days | after 90 days | |
| 13 | 930 | 930 | 925 | 930 | 930 | 930 | o |
| 14 | 915 | 920 | 915 | 900 | 910 | 910 | o |
| 15 | 900 | 910 | 910 | 900 | 910 | 910 | o |
| 16 | 900 | 900 | 890 | 890 | 890 | 890 | o |
| 17 | 900 | 900 | 890 | 910 | 900 | 910 | o |
| 18 | 890 | 880 | 890 | 900 | 900 | 880 | o |
| 19 | 910 | 900 | 910 | 880 | 880 | 880 | o |
| 20 | 900 | 890 | 890 | 890 | 880 | 880 | o |
| 21 | 890 | 880 | 890 | 900 | 900 | 890 | o |
| 22 | 890 | 890 | 890 | 880 | 870 | 870 | o |

Note
*same as described in Table 1
**same as described in Table 1

As will be apparent from the comparative test results shown in Table 2, coatings prepared from coating compositions of the present invention have an anti-corrosive potential within an optimum range of from −850 mV to −950 mV, and almost no formation of white deposit is observed.

What we claim is:

1. An anti-corrosion coating composition comprising as main components zinc powder and at least one binder selected from the group consisting of alkyl orthosilicates and alkali metal silicates wherein the alkyl groups of said alkyl orthosilicates contain from one to four carbon atoms and the weight ratio of said binder to said zinc powder is in the range of from 1:12 to 1:18, and further containing at least one member selected from the group consisting of ultrafine particulate aluminum oxide and ultrafine particulate titanium oxide in an amount of 0.05 to 2.0 parts by weight per 100 parts by weight of the zinc powder, wherein said ultrafine particulate oxide has an average particle size of 5 to 50 mμ and a specific surface area of 30 to 120 m²/g.

2. An anti-corrosion coating composition as set forth in claim 1 wherein said binder is at least one alkali metal silicate selected from the group consisting of sodium silicate, potassium silicate and lithium silicate.

3. An anti-corrosion coating composition as set forth in claim 2 wherein an amine is incorporated in an amount of 100 to 200 parts by weight per 100 parts by weight of said ultrafine particulate oxide.

4. An anti-corrosion coating composition as set forth in claim 3 wherein the amine is at least one member selected from the group consisting of monoethanol amine, diethanol amine, triethanol amine, triethylene tetramine, tetraethylene pentamine and pentaethylene hexamine.

5. An anti-corrosion coating composition as set forth in claim 3 wherein at least one member selected from the group consisting of sodium sulfide, potassium sulfide, potassium thiosulfate, sodium thiosulfate and potassium permanganate is further incorporated in an amount of 0.1 to 0.5 part by weight per 100 parts by weight of the zinc powder.

* * * * *

UNITED STATES PATENT AND TRADEMARK OFFICE
CERTIFICATE OF CORRECTION

PATENT NO. : 4,219,358
DATED : August 26, 1980
INVENTOR(S) : Toshiharu Hayashi and Kenji Kurosawa It is certified that error appears in the above-identified patent and that said Letters Patent are hereby corrected as shown below:

Column 10, line 63, change "50 mµ" to --40 mµ--.

Signed and Sealed this

Twenty-eighth Day of October 1980

[SEAL]

Attest:

SIDNEY A. DIAMOND

Attesting Officer

Commissioner of Patents and Trademarks